United States Patent
Olyunin et al.

(10) Patent No.: US 10,476,306 B2
(45) Date of Patent: Nov. 12, 2019

(54) METHOD FOR CONTROL IN WIRELESS POWER TRANSFER SYSTEMS

(71) Applicant: SAMSUNG ELECTRONICS CO., LTD., Suwon-si (KR)

(72) Inventors: Nikolay Nikolayevich Olyunin, Perm (RU); Alexander Gennadevich Chernokalov, Korolev (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 105 days.

(21) Appl. No.: 15/325,737

(22) PCT Filed: Jul. 15, 2015

(86) PCT No.: PCT/KR2015/007348
§ 371 (c)(1),
(2) Date: Jan. 12, 2017

(87) PCT Pub. No.: WO2016/010362
PCT Pub. Date: Jan. 21, 2016

(65) Prior Publication Data
US 2017/0250573 A1 Aug. 31, 2017

(30) Foreign Application Priority Data
Jul. 15, 2014 (RU) .................. 2014129195

(51) Int. Cl.
*H02J 50/12* (2016.01)
*H02M 7/5388* (2007.01)

(52) U.S. Cl.
CPC .......... *H02J 50/12* (2016.02); *H02M 7/5388* (2013.01)

(58) Field of Classification Search
CPC . H02J 5/005; H02J 7/025; H02J 17/00; B60L 11/182; H02M 7/5388
See application file for complete search history.

(56) References Cited

U.S. PATENT DOCUMENTS 5,838,116 A 11/1998 Katyl et al.
5,959,850 A * 9/1999 Lim .................. H02M 3/33569
363/132
(Continued)

FOREIGN PATENT DOCUMENTS

JP 2013-183548 A 9/2013
WO 2013/081995 A2 6/2013
WO 2013/150726 A1 10/2013

OTHER PUBLICATIONS

Search Report dated Oct. 23, 2015 issued by the International Searching Authority in counterpart International Patent Application No. PCT/KR2015/007348 (PCT/ISA/210).
(Continued)

*Primary Examiner* — Rexford N Barnie
*Assistant Examiner* — David A Shiao
(74) *Attorney, Agent, or Firm* — Sughrue Mion, PLLC (57) ABSTRACT

Claimed is a method for control in wireless power transfer systems and a wireless power transfer system implementing such method. The system comprises a transmitting inductor; a receiving inductor spaced apart from the transmitting inductor; a half bridge inverting circuit or a full bridge inverting circuit with constant switching frequency for driving the current in the transmitting inductor, wherein said half bridge inverting circuit comprises at least two switches, or said full bridge inverting circuit comprises at least two diagonal pairs of switches. The switches or diagonal pairs of switches are configured to be turned on complementarily, and the current amplitude in the transmitting inductor is controlled by varying the difference between the on-times of said switches. The claimed method and system provide efficient power transfer in conditions of variable load and/or variable input voltage and/or variable coupling between Tx and Rx parts.

14 Claims, 5 Drawing Sheets

(56) References Cited

U.S. PATENT DOCUMENTS

| | | |
|---|---|---|
| 6,436,299 B1 | 8/2002 | Baarman et al. |
| 7,649,958 B2 | 1/2010 | Macphail et al. |
| 8,217,621 B2 | 7/2012 | Tsai et al. |
| 8,238,125 B2 | 8/2012 | Fells |
| 8,310,101 B2 | 11/2012 | Amaratunga et al. |
| 2011/0242854 A1* | 10/2011 | Minami ............ H02M 1/4258 363/17 |
| 2011/0285210 A1 | 11/2011 | Lemmens et al. |
| 2011/0291614 A1 | 12/2011 | Yeh |
| 2011/0298418 A1 | 12/2011 | Yeh |
| 2012/0001590 A1 | 1/2012 | Yeh |
| 2012/0007367 A1 | 1/2012 | Chang |
| 2012/0068548 A1 | 3/2012 | Endo et al. |
| 2012/0091799 A1 | 4/2012 | Rofougaran et al. |
| 2012/0256620 A1 | 10/2012 | Oettinger |
| 2013/0039099 A1* | 2/2013 | Wu ............... H02M 7/53871 363/40 |
| 2013/0082536 A1* | 4/2013 | Taylor ............... H02J 7/025 307/104 |
| 2013/0154386 A1 | 6/2013 | Bae |
| 2013/0207482 A1 | 8/2013 | Madawala et al. |
| 2013/0214591 A1 | 8/2013 | Miller et al. |
| 2013/0313911 A1* | 11/2013 | Bae ................... H01F 38/14 307/104 |
| 2014/0009109 A1 | 1/2014 | Lee et al. |
| 2014/0132077 A1 | 5/2014 | Nalbant |
| 2014/0152250 A1* | 6/2014 | Vijayan ............. H02J 17/00 320/108 |
| 2014/0354074 A1* | 12/2014 | Sadakata ........... H02M 1/4225 307/104 |
| 2015/0015087 A1 | 1/2015 | Endo et al. |
| 2015/0155095 A1* | 6/2015 | Wu ................... H02J 17/00 307/104 |
| 2016/0164346 A1* | 6/2016 | Zhang ................ H02J 50/12 307/104 |

OTHER PUBLICATIONS

Written Opinion dated Oct. 23, 2015 issued by the International Searching Authority in counterpart International Patent Application PCT/KR2015/007348 (PCT/ISA/237).

"Wireless Power Transfer, System Description"; vol. 1: Low Power; Part 1: Interface Definition; Version 1.1.2; Jun. 2013; 186 pages total.

Paul Imbertson et al.; "Asymmetrical Duty Cycle Permits Zero Switching Loss in PWM Circuits with No Conduction Loss Penalty"; IEEE Transactions on Industry Applications; vol. 29; No. 1; Jan./Feb. 1993; 5 pages total.

* cited by examiner

| Measured parameter | Case 1 (low input voltage) | Case 2 (high input voltage) |
|---|---|---|
| Input AC voltage | 154 V AC | 252 V AC |
| Input power | 79.1 Watt | 82.0 Watt |
| duty cycle of the high side | $D_1 = 42\%$ | $D_1 = 17\%$ |
| duty cycle of the low side | $D_2 = 42\%$ | $D_2 = 67\%$ |
| Output voltage | 66.5 V DC | 66.5 V DC |
| Output power | 73.0 Watt | 85.0 Watt |
| Total efficiency | 92.2% | 91.5% |

METHOD FOR CONTROL IN WIRELESS POWER TRANSFER SYSTEMS

TECHNICAL FIELD

The present invention relates to inductive wireless power transfer (WPT) systems, and more particularly to methods for control in a wireless power transfer system.

BACKGROUND ART

Wireless power supply systems are known that use inductive wireless power transfer (WPT) to wirelessly convey electrical power. An inductive WPT system would typically include an inductive power supply source that uses a primary coil to wirelessly transfer energy in the form of a varying electromagnetic field (transmitting part) and a remote device that uses a secondary coil to convert the energy in the electromagnetic field into electrical power (receiving part). In such systems, adaptive WPT control is advantageous to adapt operating parameters of the WPT system over time in order to improve the efficiency of the power transfer and/or to control the amount the transferred power, and/or to avoid operating in certain modes that may be adverse for the power transfer system and/or other surrounding devices taking into account the electromagnetic nature of the wireless power transfer technique.

DISCLOSURE OF INVENTION

Technical Problem

An inductive WPT system consists of two parts: a transmitting (Tx) part and a receiving (Rx) part. The Tx part always includes at least one Tx inductor and a circuit for driving current in the Tx inductor. The Rx part always includes at least one Rx inductor and a rectifying circuit. The Tx part is connected to a DC or AC voltage source. It is typically necessary to implement control capabilities in a wireless power transfer system in order to regulate the delivered power during variations of input voltage, coupling between Tx and Rx, load pick-up current, or other operating conditions.

Various approaches may be utilized for achieving the control capability in a WPT system. These approaches include using controllable DC-DC converters within Tx and Rx parts, implementing regulating capabilities in the circuit for driving the current in the Tx inductor, applying adaptive matching techniques.

A well-known approach to the regulation of the current in the Tx inductor is connection of the Tx inductor to the inverting circuit within a resonant circuit and variation of the switching frequency. The resonant circuit may represent a series or parallel resonant tank, or a more complex combination of inductors and capacitors. In this approach the frequency dependence of the resonant circuit characteristics is utilized for regulation of the current in the Tx inductor. This approach is used in several power transmitter designs in the standard Wireless Power Consortium, System Description. Wireless Power Transfer. Volume I: Low Power. Part 1: Interface Definition. Version 1.1.2. June 2013 (hereinafter referred to as [1]) and is also described in patent application US 20130082536 A1 (Taylor J. B., Moor C. J., Baarman D. W., Mollema S. A., Moes B. C., Kuyvenhoven N. W., Nibbelink? M. J. System and method for improved control in wireless power supply systems. US Patent Application No. US 20130082536 A1. Published Apr. 4, 2013) (hereinafter referred to as [2]). The drawback of this approach consists in a variable switching frequency. Typically in WPT systems the inductance of the Rx inductor is compensated by a respective capacitor or a matching circuit in order to eliminate the phase shift between the induced voltage and the current in the Rx inductor. Elimination of this phase shift is required to maximize the power transfer efficiency. Inductance of the Rx inductor may be compensated by a single capacitor or matching circuit only at a certain frequency. If the operating frequency is changed, the power transfer efficiency will also change. Therefore, it is preferable to use a constant switching frequency in the inverting circuit in WPT systems.

Another well-known approach for the regulation of the current in a Tx inductor is variation of the input DC voltage using a controllable DC-DC converter. This approach is also used in several power transmitter designs in the standard [1] and is described in patent application [2]. The drawback of this approach consists in the need for a separate DC-DC converter with controllable output voltage prior to the circuit driving the current in the Tx inductor. This DC-DC converter reduces the overall system efficiency and increases system cost.

One more well-known approach to the regulation of the current in a Tx inductor is phase shift regulation in a full bridge inverting circuit. In this approach a controllable delay is introduced between turnings on of the diagonal switches in the bridge. This results in zero voltage applied to the circuit connected to the inverter during a controllable part of the switching period. This approach is used in Power Transmitter Design B3 in the standard [1] and described in patent application [2]. The advantage of this approach consists in constant switching frequency operation. The drawback of the approach is that it is applicable only to full bridge inverting circuits, whereas full bridge inverting circuits are more expensive and more complex in comparison with half bridge inverting circuits. One more drawback of this approach consists in relatively high conduction losses because of freewheeling idle current during the delay between conduction intervals.

Asymmetric duty cycle control was proposed in Imberston P., Mohan N. Asymmetrical duty cycle permits zero switching loss in PWM circuits with no conduction loss penalty. IEEE Transactions on Industry Applications, 29(1). 1993 (hereinafter referred to as [3]) for switch-mode power converters. However, this approach appears to have not been applied yet for regulation of current in a Tx coil in WPT systems.

Solution to Problem

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

To attend to at least some of the above-mentioned drawbacks of the prior art, an embodiment of the present invention is disclosed to provide a method for control in wireless power transfer (WPT) systems, which is suitable for WPT systems with two different types of inverting circuits, for examples half bridge and full bridge ones. Another embodiment of the present invention are also disclosed to provide WPT systems, in which the one of embodiment methods is implemented.

The present invention aims at implementing regulating capabilities in a circuit driving the current in a Tx inductor. The inventive method substantially regulates the current amplitude in the Tx inductor and is applicable to half-bridge or full-bridge inverting circuits driving the current in the Tx inductor.

The advantages of the inventive method for control in WPT systems as compared to the prior art consist in providing the WPT system with all of the following characteristics. First of all, as aforesaid, the claimed method may be implemented in a system with both half bridge and full bridge inverting circuits. Then, according to the inventive method, the system operates with constant switching frequency. Therefore there is no affect of the frequency variations on the efficiency of the WPT system. Furthermore, the WPT system, in which the inventive method is performed, does not require a separate power supply unit with controllable output voltage.

The present invention is directed to regulating the current amplitude in a Tx inductor in a wireless power transfer (WPT) system using asymmetric duty cycle control in the inverting circuit.

The transmitting part of a WPT system implemented in accordance with the invention includes a half bridge or a full bridge inverting circuit with constant switching frequency, and a Tx inductor connected to the inverting circuit alone or within a resonant circuit consisting of inductors and capacitors.

Examples of the circuits where the invention can be implemented are illustrated on FIG. 1-4.

According to an embodiment, a transmitting device of a wireless power transfer system for transmitting a power to a spatially separated receiving device is provided, the transmitting device comprising a transmitting inductor, a inverter is configured to drive a current to the transmitting inductor, the current is an AC output inverted from an DC input by using a plurality of switches and a controller is configured to control the plurality of switches to be switched complementarily, wherein the controller controls the plurality of switches to be switched in a constant frequency, and regulates an amplitude of the current by varying a difference of duty cycles between the switches being complementarily switched.

The inverter may be configured by a half-bridge inverting circuit or a full-bridge inverting circuit.

The plurality of switches may be configured by power transistors, and the controller includes at least one of gate driver for switching the plurality of switches.

The controller may vary the difference of the duty cycles depends on the input DC voltage The controller may vary the difference of the duty cycles depends on amount of power consumed by the receiving device.

The controller may vary the difference of the duty cycles depends on amount of coupling between the transmitting inductor and an receiving inductor of the receiving device.

The controller may vary the difference of the duty cycles depends on a distance between the transmitting device and the receiving device.

In an embodiment, a method for controlling a transmitting device of a wireless power transfer system for transmitting a power to a spatially separated receiving device is provided, the method comprising, inputting a direct current (DC), inverting the inputted DC to an alternating current (AC) as an output by complementary switching a plurality of switches in a constant frequency, driving the AC output to a transmitting inductor of the transmitting device and varying a difference of duty cycles between the switches being complementarily switched for regulating an amplitude of the current.

The inverting may be operated by a half-bridge inverting circuit or a full-bridge inverting circuit.

The plurality of switches may be configured by power transistors, and the switching is operated by at least one of gate driver.

The difference of duty cycles may be varied depending on the input DC voltage.

The difference of duty cycles may be varied depending on amount of power consumed by the receiving apparatus.

The difference of duty cycles may be varied depending on amount of coupling between the transmitting inductor and an receiving inductor of the receiving apparatus.

The difference of duty cycles may be varied depending on a distance between the transmitting apparatus and the receiving apparatus.

It is apparent for a person skilled in the art that the various embodiments of the present invention may take the form of other particular embodiments without departing from the general essence and scope of the claimed invention, which embodiments may be derived by ones skilled in the art after reading and understanding the detailed description of the present invention provided below.

BRIEF DESCRIPTION OF DRAWINGS

For a more complete understanding of the present disclosure and its advantages, reference is now made to the following description taken in conjunction with the accompanying drawings, in which like reference numerals represent like parts.

BEST MODE FOR CARRYING OUT THE INVENTION

The exemplary embodiments of the present disclosure may be diversely modified.

Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

The terms "first", "second", etc. may be used to describe diverse components, but the components are not limited by the terms. The terms are only used to distinguish one component from the others.

The terms used in the present application are only used to describe the exemplary embodiments, but are not intended to limit the scope of the disclosure. The singular expression also includes the plural meaning as long as it does not differently mean in the context. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

In the exemplary embodiment of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Hereinafter, the present disclosure will be described in detail with reference to the accompanying drawings.

A wireless power transfer (WPT) system, in which the inventive method for control may be implemented, in different embodiments of the claimed invention may take the form of a system with a half-bridge inverting circuit or a full-bridge inverting circuit with a constant switching frequency. Referring to FIG. 1-4, the system consists in general of a voltage source 1, switches (designated individually as S1, S2, S3, S4 where applicable), transmitting (Tx) inductor 3, capacitor 4, receiving (Rx) inductor 5, load 7. The receiving (Rx) part of the system taken in general is designated with reference numeral 6 for the sake of simplicity. It is noted that the receiving part is shown in a generalized manner for the sake of simplicity, as the inventive concept is concentrated substantially on the transmitting (Tx) part of the system, where the main features of the claimed invention are implemented. Each of the FIGS. 1-4 is accompanied with a diagram, which schematically illustrates the principle of asymmetric duty cycle control in each of the embodiments shown on FIGS. 1-4. Here, the both Tx and Rx parts may treat independently as two devices and can be called by Tx and Rx devices.

In the method for controlling the WPT system according to the claimed invention, the switches in the half bridge circuit or the diagonal pairs of switches in the full bridge circuit are turned on complementarily, i.e. within one time period (which, by way of an example, may be designated as "1") both of the switches (or diagonal pairs of switches) operate substantially in an alternating manner, i.e. when one switch or pair of switches is "on", the other one is "off" and vice versa, within said time period. The "on" time of the respective switch or pair of switches may be characterized substantially as a "duty cycle", where said duty cycle may be defined as a share (or percentage) of a total time period, for which a signal is active (i.e. the switch is substantially "on"), $D=T/P\times 100\%$, where D is the duty cycle, T is a period of time said switch is "on" and P is the total period of time. It should be noted that the duty cycles of the switches in the half bridge circuit or the duty cycles of the diagonal pairs of switches in the full bridge circuit are controllable and may be not equal. In particular according to the claimed invention, when one switch of the inverter operates with duty cycle D, the other switch operates with duty cycle 1-D, if the dead time is neglected. The amplitude of the current in the Tx inductor depends on the duty cycle D. If D=0, then the amplitude of the current in the Tx inductor is zero and no power can be transferred to a load. If D=50%, then the amplitude of the current in the Tx inductor is maximum, and maximum power can be transferred to a load. Thus, the amplitude of current in the Tx inductor is controlled substantially by the difference between the aforementioned duty cycles.

Figure 1:
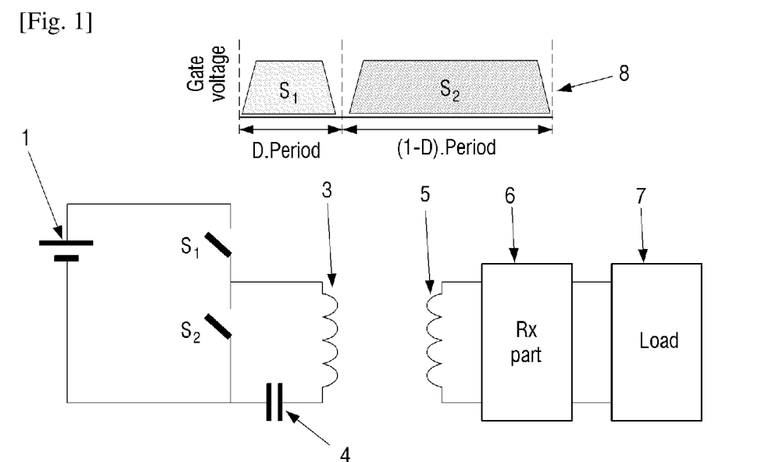
FIGS. 1-4 schematically show embodiments of a circuit where the invention can be implemented.

As shown on FIG. 1, according to an embodiment the circuit of the wireless power transfer (WPT) system comprises a pair of switches S1 and S2, which are designed to operate complementarily, i.e. these switches have duty cycles D and 1-D, respectively. In this scheme, switch S1 is a high side switch and switch S2 is a low side switch. These duty cycles are illustrated on a diagram 8 that accompanies the schematic representation of the circuit.

Figure 2:
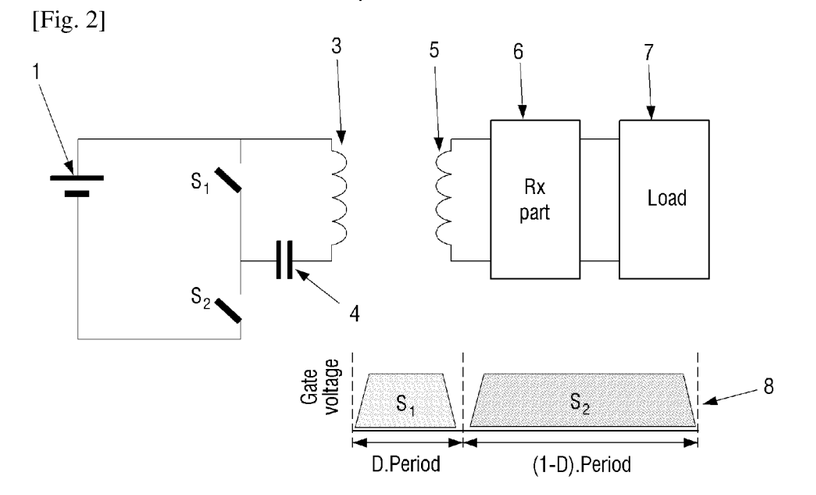

Referring to FIG. 2, another example of the circuit is shown, which differs from the one of FIG. 1 in the arrangement of the capacitor 4 and the switches S1 and S2, respectively, in that switch S1 is a low side switch and switch S2 is a high side switch. Again, in this embodiment the switches operate complementarily, i.e. have duty cycles D and 1-D, respectively, as illustrated on diagram 8.

Figure 3:
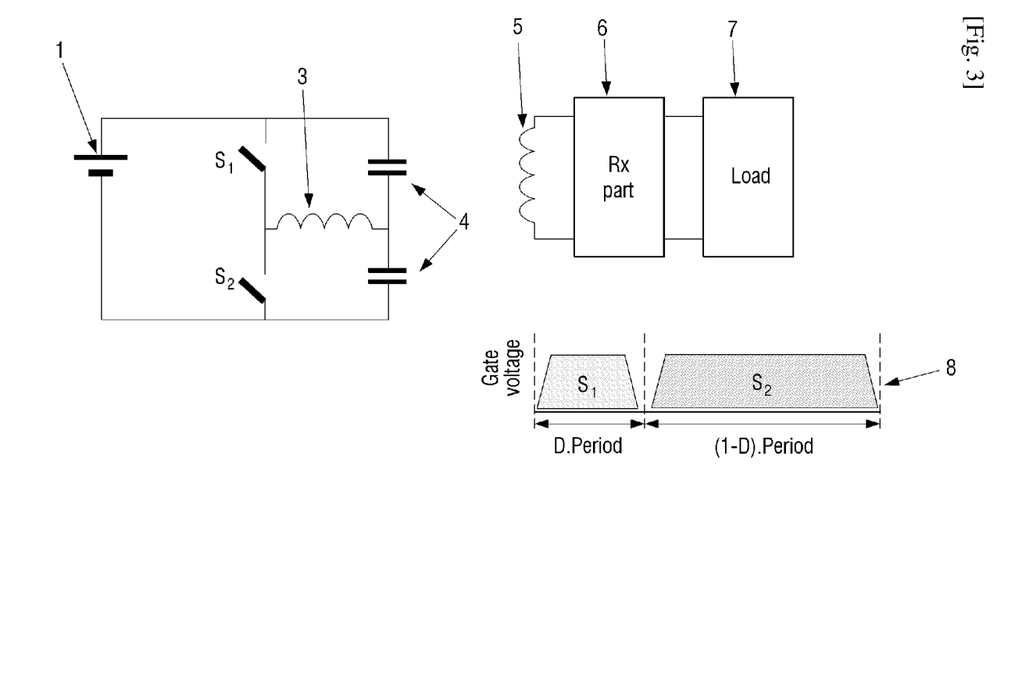

Referring to FIG. 3, another embodiment of the circuit is shown, where there are two capacitors 4 instead of one capacitor 4 in the embodiments of FIGS. 1 and 2. The operation of the switches S1 and S2 may be characterized as substantially the same as in the previous embodiments, i.e. with duty cycles D and 1-D, respectively.

Figure 4:
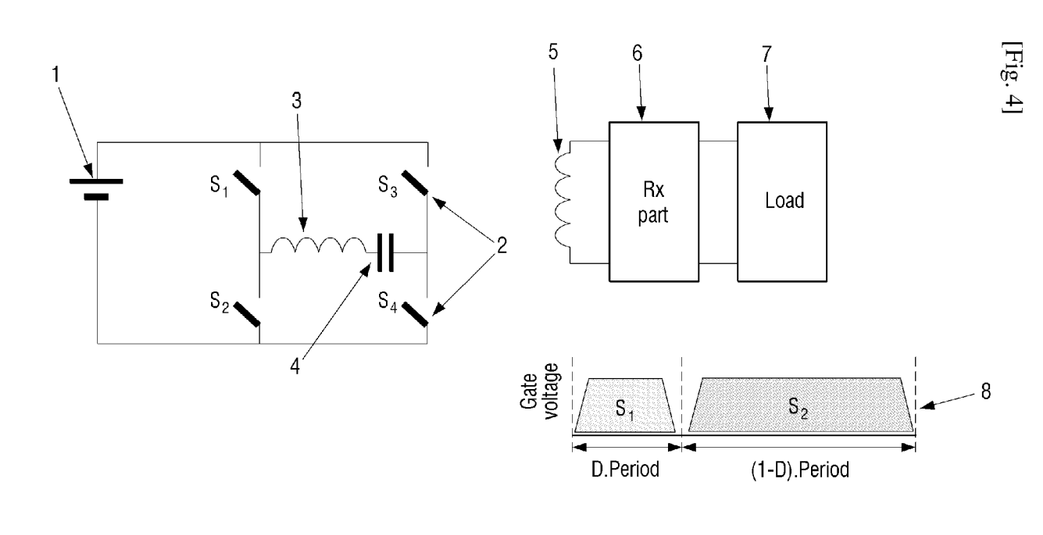

FIG. 4 shows an embodiment of the wireless power transfer (WPT) system according to the invention, which comprises a full bridge inverter circuit as compared to half bridge circuits used in the embodiments shown on FIGS. 1-3. In this embodiment, there are four switches S1, S2, S3, S4. These four switches constitute two diagonal pairs of switches, which are configured to be turned on complementarily.

In all embodiments the system is configured to control the amount of energy stored in said transmitting inductor by the difference between the on-times of said switches or said diagonal pairs of switches, depending on whether a half bridge inverter circuit or a full bridge inverter circuit is implemented in the system. Taken in general, the system comprises an inverting circuit with constant switching frequency and an inductor connected to the inverting circuit alone or within a resonant circuit consisting of inductors and capacitors. In the latter case the amplitude of AC current in the inductor may be advantageously increased and the DC current flow through the inductor may be blocked.

In all embodiments of the claimed system and the respective control method the use of switches is essential for regulating the current amplitude in the transmitting inductor, and thus wireless power transfer system is optimally controlled by switching said switches or diagonal pairs of switches in a complementary manner, by varying the difference between the on-times of said switches or diagonal pairs of switches, i.e. varying the duty cycles of said switches. The amplitude of the current in the Tx inductor depends on the duty cycle D. If D=0, then the amplitude of the current in the Tx inductor is zero and no power can be transferred to a load. If D=50%, then the amplitude of the current in the Tx inductor is maximum, and maximum power can be transferred to a load. Thus, the amplitude of current in the Tx inductor is controlled substantially by the difference between the aforementioned duty cycles.

For this purpose, switches may be advantageously implemented as metal-oxide-semiconductor field-effect transistor (MOSFET) type switches, in particular power MOSFETs that are characterized, in particular, by low on-resistance and high current carrying capability. Different types of field effect transistor (FET) switches or other kinds of switches (e.g. gallium nitride FETs, other types of FETs, insulated-gate bipolar transistors (IGBTs), or bipolar junction transistors, BJTs) may also be suitable for certain implementations of the claimed system and method as well.

The switches in all embodiments of the claimed invention are driven by a gate driver, e.g. a combined high and low side gate driver with independent high and low side referenced output channels.

The gate driver may contain a logic input, which is preferably compatible with standard CMOS (complementary metal-oxide-semiconductor) or LSTTL (low power Schottky transistor-transistor logic) outputs, thus the gate driver may be connected to a controller such as a programmable logic controller (PLC) or microcontroller or the like.

In all embodiments the system may be advantageously designed to operate in zero-voltage switching (ZVS) mode. The ZVS mode may be characterized by zero voltage between the drain and source of a switch at the moment of turning on the switch. In the case of ZVS mode operation the switching losses in the system may be significantly reduced.

Figure 5:
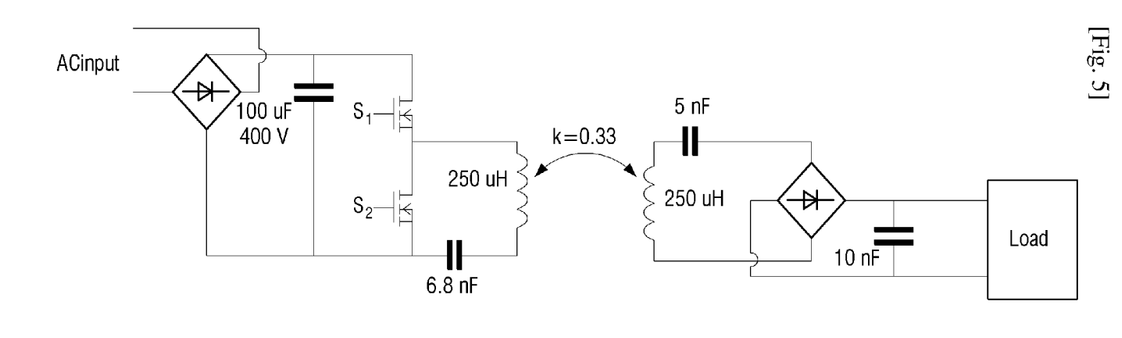
FIG. 5 schematically shows an exemplary circuit where the inventive method was implemented.

The possibility of practicing the invention and achieving the above-described advantages was tested in an exemplary circuit depicted on FIG. 5, in which the claimed method was implemented. The exemplary circuit was implemented as a half bridge inverter circuit similar to the embodiment shown on FIG. 1. The switches S1 and S2 were MOSFETs FQPF10N60C driven by IR2101 gate driver. FQPF10N60C is a N-channel enhancement mode power field transistor that advantageously has low on-resistance which reduces power dissipation within the MOSFET, and high current carrying capability. The logical signals at the inputs of the gate driver were taken from a signal generator. The switching frequency of both switches was constant, 140 kHz. The system was tested with two different input AC voltages: 154 V and 252 V. When the input AC voltage was 154 V the duty cycles of both switches S1 and S2 were 42%. When the input AC voltage was 252 V the duty cycle of the switch S1 was 17% and the duty cycle of the switch S2 was 67%.

Figure 6:
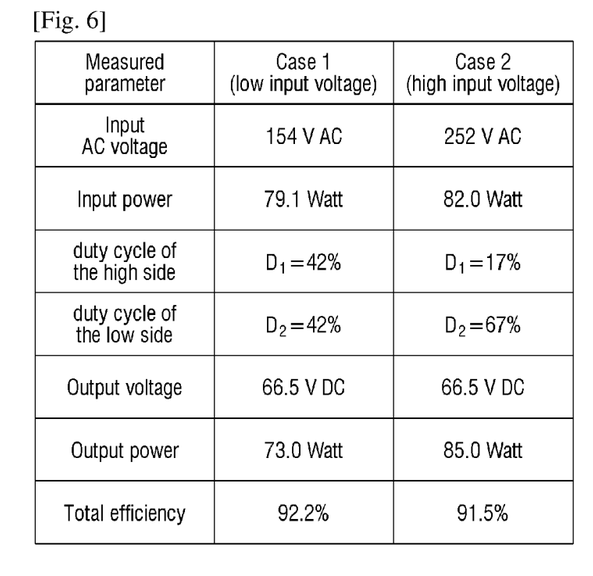
FIG. 6 is a table showing various system values in two cases with different input voltages and illustrating the control of the WPT system by the difference of the duty cycles of the switches.

The output DC voltage at the Rx part was 66.5 V in both cases. The transferred power was 73 Watt in the first case and 75 Watt in the second case. The measured power transfer efficiency in both cases was more than 90%. The measured parameters corresponding to both input voltages are summarized in the table on FIG. 6.

The method for controlling the wireless power transfer system according to various exemplary embodiments described above may be implemented in a program so as to be provided to the wireless power transfer system. Particularly, the program including the control method of the Tx part may be stored and provided in a non-transitory computer readable medium.

The non-transitory computer readable medium does not mean a medium storing data for a short period such as a register, a cash, a memory, or the like, but means a machine-readable medium semi-permanently storing the data. Specifically, various applications or programs described above may be stored and provided in the non-transitory computer readable medium such as a compact disc (CD), a digital versatile disk (DVD), a hard disk, a Blu-ray disk, a universal serial bus (USB), a memory card, a read-only memory (ROM), or the like.

Hereinabove, although the exemplary embodiments of the present disclosure have been shown and described, it should be understood that the present disclosure is not limited to the disclosed embodiments and may be variously changed by those skilled in the art without departing from the spirit and the scope of the present disclosure. Therefore, the present disclosure should be construed as including all the changes, equivalents, and substitutions included in the spirit and scope of the present disclosure.

INDUSTRIAL APPLICABILITY

The proposed method should be used for designing WPT systems with variable load and/or variable input voltage and/or variable coupling between Tx and Rx parts.

The invention claimed is:

1. A transmitting device for wirelessly transmitting a power to a spatially separated receiving device, the transmitting device comprising:
   a transmitting inductor;
   an inverter comprising a first switch and a second switch that are connected to each other in series via a first common node, and a first capacitor and a second capacitor that are connected to each other in series via a second common node, the inverter being configured to invert a direct current (DC) of a DC voltage source into an alternating current (AC) and provide the AC to the transmitting inductor disposed between the first common node of the first and the second switches and the second common node of the first and the second capacitors; and
   at least one processor configured to:
   control the first switch and the second switch to alternately turn on/off at a constant frequency, wherein a time for which the first switch is turned on is different from a time for which the second switch is turned on;
   wherein the at least one processor is configured to regulate an amplitude of the AC by varying the time for which the first switch is turned on and the time for which the second switch is turned on.

2. The transmitting device of claim 1, wherein the inverter comprises a half-bridge inverting circuit.

3. The transmitting device of claim 1, wherein each of the first switch and the second switch comprises at least one power transistor, and
   wherein the at least one processor includes at least one gate driver for switching the first switch and the second switch.

4. The transmitting device of claim 1, wherein the at least one processor is configured to vary the time for which the first switch is turned on and the time for which the second switch is turned on based on a DC voltage of the DC voltage source.

5. The transmitting device of claim 1, wherein the at least one processor is configured to vary the time for which the first switch is turned on and the time for which the second switch is turned on based on amount of power consumed by the receiving device.

6. The transmitting device of claim 1, wherein the at least one processor is configured to vary the time for which the first switch is turned on and the time for which the second switch is turned on based on amount of coupling between the transmitting inductor and a receiving inductor of the receiving device.

7. The transmitting device of claim 1, wherein the at least one processor is configured to vary the time for which the first switch is turned on and the time for which the second switch is turned on based on a distance between the transmitting device and the receiving device.

8. A method for controlling a transmitting device for transmitting wirelessly a power to a spatially separated receiving device, the method comprising:
   receiving a direct current (DC) from a DC voltage source;

inverting the DC to an alternating current (AC) using a first switch, a second switch, a first capacitor, and a second capacitor, the first switch and the second switch being connected to each other in series via a first common node, and the first capacitor and the second capacitor being connected to each other in series via a second common node;

providing the AC to a transmitting inductor disposed between the first common node of the first and the second switches and the second common node of the first and the second capacitors, by controlling, by at least one processor of the transmitting device, the first switch and the second switch to alternately turn on/off at a constant frequency, wherein a time for which the first switch is turned on is different from a time for which the second switch is turned on; and regulating, by the at least one processor, an amplitude of the AC by varying the time for which the first switch is turned on and the time for which the second switch is turned on.

9. The method of claim 8, wherein the inverting is operated by a half-bridge inverting circuit.

10. The method of claim 8, wherein each of the first switch and the second switch comprises at least one power transistor, and
wherein the switching is operated by at least one gate driver.

11. The method of claim 8, wherein the varying is varying the time for which the first switch is turned on and the time for which the second switch is turned on based on a DC voltage of the DC voltage source.

12. The method of claim 8, wherein the varying is varying the time for which the first switch is turned on and the time for which the second switch is turned on based on amount of power consumed by the receiving device.

13. The method of claim 8, wherein the varying is varying the time for which the first switch is turned on and the time for which the second switch is turned on based on amount of coupling between the transmitting inductor and a receiving inductor of the receiving device.

14. The method of claim 8, wherein the varying is varying the time for which the first switch is turned on and the time for which the second switch is turned on based on a distance between the transmitting device and the receiving device.

* * * * *